United States Patent

Tewinkle et al.

(10) Patent No.: US 7,812,872 B2
(45) Date of Patent: Oct. 12, 2010

(54) SYSTEM FOR CONTROLLING IMAGE DATA READOUT FROM AN IMAGING DEVICE

(75) Inventors: Scott L. Tewinkle, Ontario, NY (US); Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 970 days.

(21) Appl. No.: 11/143,245

(22) Filed: Jun. 2, 2005

(65) Prior Publication Data

US 2006/0274175 A1 Dec. 7, 2006

(51) Int. Cl.
H04N 3/14 (2006.01)
H04N 5/335 (2006.01)

(52) U.S. Cl. ............... 348/294; 348/296; 348/302; 348/308; 348/312

(58) Field of Classification Search ......... 348/272, 348/273, 294, 296, 302, 308, 312; 358/482, 358/494, 505, 514; 250/208.1, 291, 292
See application file for complete search history.

(56) References Cited

U.S. PATENT DOCUMENTS

| | | | | |
|---|---|---|---|---|
| 5,148,168 | A | | 9/1992 | Masuda et al. |
| 5,148,268 | A | * | 9/1992 | Tandon et al. ......... 348/280 |
| 5,153,420 | A | * | 10/1992 | Hack et al. ........... 250/208.1 |
| 5,166,755 | A | * | 11/1992 | Gat ........................ 356/419 |
| 5,519,514 | A | * | 5/1996 | TeWinkle ............... 358/514 |
| 6,014,160 | A | | 1/2000 | Tewinkle |
| 6,044,180 | A | | 3/2000 | Brandestini |
| 6,181,375 | B1 | * | 1/2001 | Mitsui et al. ....... 348/240.99 |
| 6,693,670 | B1 | * | 2/2004 | Stark ...................... 348/308 |
| 2002/0122218 | A1 | | 9/2002 | TeWinkle |
| 2003/0227656 | A1 | * | 12/2003 | TeWinkle ............... 358/482 |

FOREIGN PATENT DOCUMENTS

EP 0 740 460 10/1996

OTHER PUBLICATIONS

Scott L. TeWinkle, entitled "System for Controlling Inetgration Times of Photosensors in an Imaging Device," U.S. Appl. No. 11/143,173 being filed simultaneously herewith.

* cited by examiner

*Primary Examiner*—Yogesh K Aggarwal
(74) *Attorney, Agent, or Firm*—Simpson & Simpson, PLLC

(57) ABSTRACT

An imaging apparatus, such as used in a digital camera or scanner, includes at least one photosensor chip. Each chip includes one line for conveying a signal causing an integration event of a selected subset of photosensors on the chip, the integration event being one of a starting or ending an integration period for the subset of photosensors. Each chip also includes at least two selection lines, for conveying a multi-bit code identifying the selected subset of photosensors for the integration event.

16 Claims, 2 Drawing Sheets

US 7,812,872 B2

SYSTEM FOR CONTROLLING IMAGE DATA READOUT FROM AN IMAGING DEVICE

CROSS-REFERENCE TO RELATED APPLICATION

Cross-reference is hereby made to the following co-pending US Patent Application, assigned to the Assignee hereof, titled "System for Controlling Integration Times of Photosensors in an Imaging Device," U.S. Ser. No. 11/143,173, now Publication No. 20060274174 being filed simultaneously herewith on Jun. 2, 2005.

INCORPORATION BY REFERENCE

The following U.S. patents are hereby incorporated by reference in their entireties: U.S. Pat. Nos. 5,148,168 and 5,519,514.

TECHNICAL FIELD

The present disclosure relates to image scanning arrays in which a set of photosensors are arranged in a linear array, such as for scanning of hard copy images for conversion to digital data.

BACKGROUND

Image sensor arrays typically comprise a linear array of photosensors which raster scan an image-bearing document and convert the microscopic image areas viewed by each photosensor to video image signals. Following an integration period, the image signal charges formed on the photosensors are amplified and transferred as analog video signals to a common output line or bus through successively actuated multiplexing transistors.

For high-performance image sensor arrays, one embodiment includes an array of photosensors of a width comparable to the width of a page being scanned, to permit imaging generally without the use of reductive optics. In order to provide such a "full-width" array, however, relatively large silicon structures must be used to define the large number of photosensors. In one design, an array is made of twenty silicon chips, butted end-to-end, each chip having 248 active photosensors spaced at 400 photosensors per inch. Typically, the chips which are butted to form the array are formed in a silicon wafer, which is then "diced" into a number of chips, which are individually tested and then arranged into a bar shape.

In a sensor array of this design, each of the chips is a separate integrated circuit. Typically, each chip has its own individual video output, for the downloading of image signals ultimately from the photosensors on that particular chip. When an image is being scanned, video signals are output from each chip at a very high rate as the original hard-copy image moves past the linear array of photosensors on the chip. Thus, if the intended resolution of the chip in a bar is 400 spots per inch, a line of video data must be output from the chip every time the original image moves ¹⁄₄₀₀th of an inch.

An important concept with digital image scanners is "integration time." The integration time is analogous to the opening and closing of the shutter of a film camera: it is the time period in which light from an image to be recorded is received. In the context of recording digital images, an integration time begins when a photosensor is set at a predetermined reference charge level and light impinging on the photosensor is permitted to influence the charge; the integration time ends when received light no longer influences the photosensor and the final charge is loaded out of the photosensor as a video signal. U.S. Pat. No. 5,148,168 gives a description of one embodiment of an image sensor in which three sets of photosensors, one for each primary color, are used to record a full-color image. U.S. Pat. No. 5,519,514 explains why precise control of the integration times of each of the three primary-color sets of photosensors is important to resulting image quality in a hard-copy scanner.

SUMMARY

According to one aspect, there is provided a method of operating an imaging apparatus, the apparatus having a plurality of subsets of photosensors, comprising: sending to the apparatus an integration control signal, the integration control signal causing a change in integration state of a selected subset of photosensors; and sending to the apparatus a selection signal, the selection signal having at least two bits, the selection signal identifying the selected subset of photosensors.

According to another aspect, there is provided an imaging apparatus, comprising a plurality of subsets of photosensors. At least one line accepts an integration control signal, the integration control signal causing a change in integration state of a selected subset of photosensors. At least two lines accept a selection signal, the selection signal having at least two parallel bits, the selection signal identifying the selected subset of photosensors.

DETAILED DESCRIPTION

Figure 1:
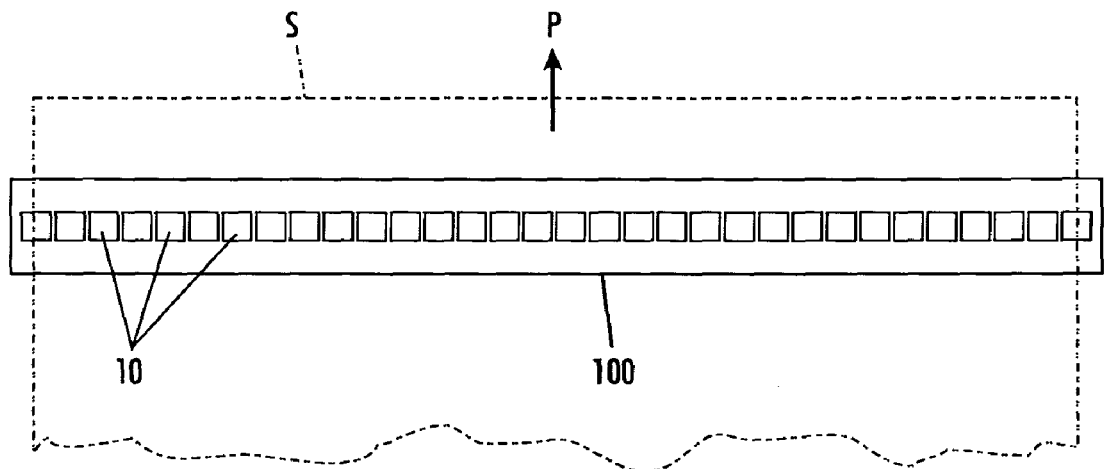
FIG. 1 is a plan view of a portion of a "full-width-array" input scanner as would be used in office equipment such as a digital copier.

FIG. 1 is a plan view of a portion of a "full-width-array" input scanner as would be used in office equipment such as a digital copier. A set of photosensor chips, each indicated as 10, is arranged on a circuit board 100. Each chip 10 includes a set of photosensors, as will be described below. Together, the chips 10 on board 100 form one or more linear arrays of photosensors that extend a length comparable to the width of an image-bearing sheet such as S effectively moving in a process direction P. The sheet S can move relative to the board 100 by being placed on a platen (not shown) relative to which the board 100 moves; or the sheet S can be fed through a document handler (not shown). As the sheet S moves past board 100, a series of small areas on the sheet S reflect light (from a source, not shown) into photosensors on the chips 10. The chips 10 receive the reflected light from sheet S and output image signals for subsequent recording and processing.

Figure 2:
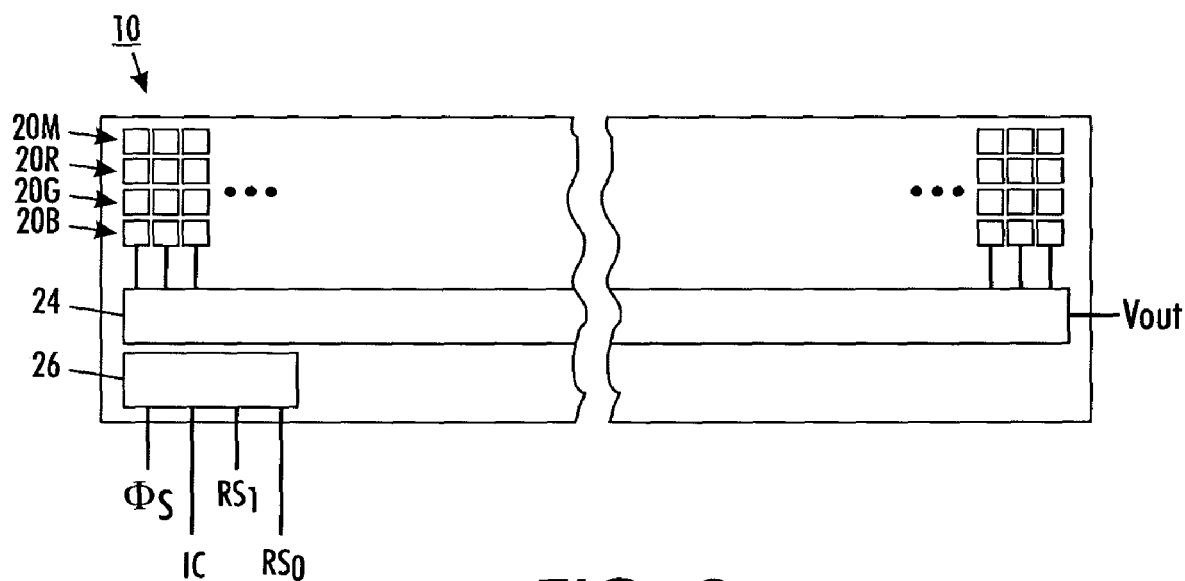
FIG. 2 is a plan view of a photosensor chip in isolation.

FIG. 2 shows a photosensor chip 10 in isolation. In this embodiment, each chip 10 includes four linear arrays, or rows, of photosensors, labeled 20M (for monochrome), 20R (for red), 20G (for green) and 20B (for blue). Each array is provided with a translucent filter (not shown) that causes the array to be sensitive to a particular color or range of wavelength. The monochrome array 20M is sensitive to light throughout the visible spectrum, and is useful when scanning images for monochrome-only image data, as would be useful, for example, in a monochrome copier or facsimile machine, or for optical character scanning. The photosensors may also be provided with other types of filters, such as for infrared blocking.

In the present embodiment, for each "column" (as shown in the Figure) of one photosensor of each type 20M, 20R, 20G, 20B, there is one output line to an output shift register 24. A general description of how multiple photosensors in a column send signals over one line to a shift register is given in U.S. Pat. No. 5,148,168 mentioned above. It will be evident that each photosensor of each type 20M, 20R, 20G, 20B in a column will "look at" one small area of an image being recorded, to obtain full color image data about the small area. A description of how the action of multiple photosensors of different colors must be coordinated is given in U.S. Pat. No. 5,519,514 mentioned above. Once a "scanline" of digital image signals is loaded into shift register 24, the image data for that scanline is output from the chip 10, such as through line $V_{OUT}$.

When reading out video signals from various subsets of photosensors, each photosensor undergoes different changes in its "integration state." Briefly, with any of various basic arrangements of photosensor design, when a predetermined charge or potential level is placed on a photosensor, the photosensor enters an "integration period," in which any light falling on the photosensor is used to accumulate a charge on the photosensor. To end the integration period, another predetermined potential is placed on the photosensor. Following the integration period, the accumulated charge, which relates generally to the intensity of light having fallen on the photosensor during the integration period, is transferred off the photosensor in a known manner. As used herein, "changing the integration state" of a photosensor includes any instance in which a potential or charge is placed on or is associated with a photosensor, to begin or end an integration period.

In the present embodiment, different subsets of all photosensors on a chip such as 10 are controlled by signals originating off the chip. Among these signals are signals to change an integration state of a selected subset of photosensors, as well as signals for identifying the selected subset of photosensors. If there are four or more selectable subsets of photosensors on a chip, such as in the four-row color chip such as shown in FIG. 2, a structure and system for operating the chip can include, in this embodiment, a single line for conveying an "integration signal" causing the photosensor in a selected subset to change an integration state, either to begin or end an integration period; and a set of lines for conveying a parallel binary "selection signal," identifying the selected subset for changing the integration state thereof. In this way a relatively small number of lines onto the chip such as 10 can be used to control the integration periods of each of a number of subsets of photosensors. (In the FIG. 1 embodiment, each chip 10 will have its own integration signal line and selection lines; but other architectures are possible.)

As can be seen in FIG. 2, the controller 26 (which need not be a discrete portion of the chip 10, as shown in the embodiment, but rather may reflect capabilities that reside in various places on or off chip 10) accepts four lines, each carrying a specific type of signal, from a control system off the chip: a pixel clock $\phi_S$, an integration control line IC, and in this case two "row select" lines RS1 and RS0, which are types of selection lines. The pixel clock $\phi_S$ is typically a constantly-running square wave of a predetermined frequency. The integration control line IC is a line bearing some type of integration signal (such as, but not limited to, a pulse, or a change in state) that causes the photosensors in a selected row or other subset to have a change in integration state. The row select lines RS1 and RS0 carry a two-bit parallel code identifying the subset to change in integration state in response to the next signal on the IC line. In the present embodiment, the two-bit parallel lines can thus select, by a binary code 00, 01, 10, or 11, one of the four rows of photosensors 20M, 20R, 20G, 20B in the chip of FIG. 2.

In a practical application, a change in integration state, as it directly affects the time in which a particular photosensor "looks at" a small area on an image being scanned, is desired to occur at a precisely-predetermined time within a cycle of operation. In the present embodiment, there is placed on lines RS1 and RS2 a signal (such as in the form of high and low potentials on the lines) corresponding to the binary code of the next subset of photosensors to be instructed to undergo a change in integration state in the course of an operation cycle of the chip. For instance, if it is desired to start the integration period of the subset of photosensors identified by the code 01, RS1 is set to 0 (low), RS0 is set to 1 (high), thus communicating the selection code 01 to controller 26. The controller 26 is designed to cause the change in integration state to the currently (or most recently) identified subset of photosensors, in response to a predetermined type of signal (such as a pulse or change in state) on the integration control line IC. In one embodiment, the change in integration state simply means that if the selected subset of photosensors is currently in an integration period, the signal on the control line IC causes the integration period to stop, and vice-versa.

Figure 3:
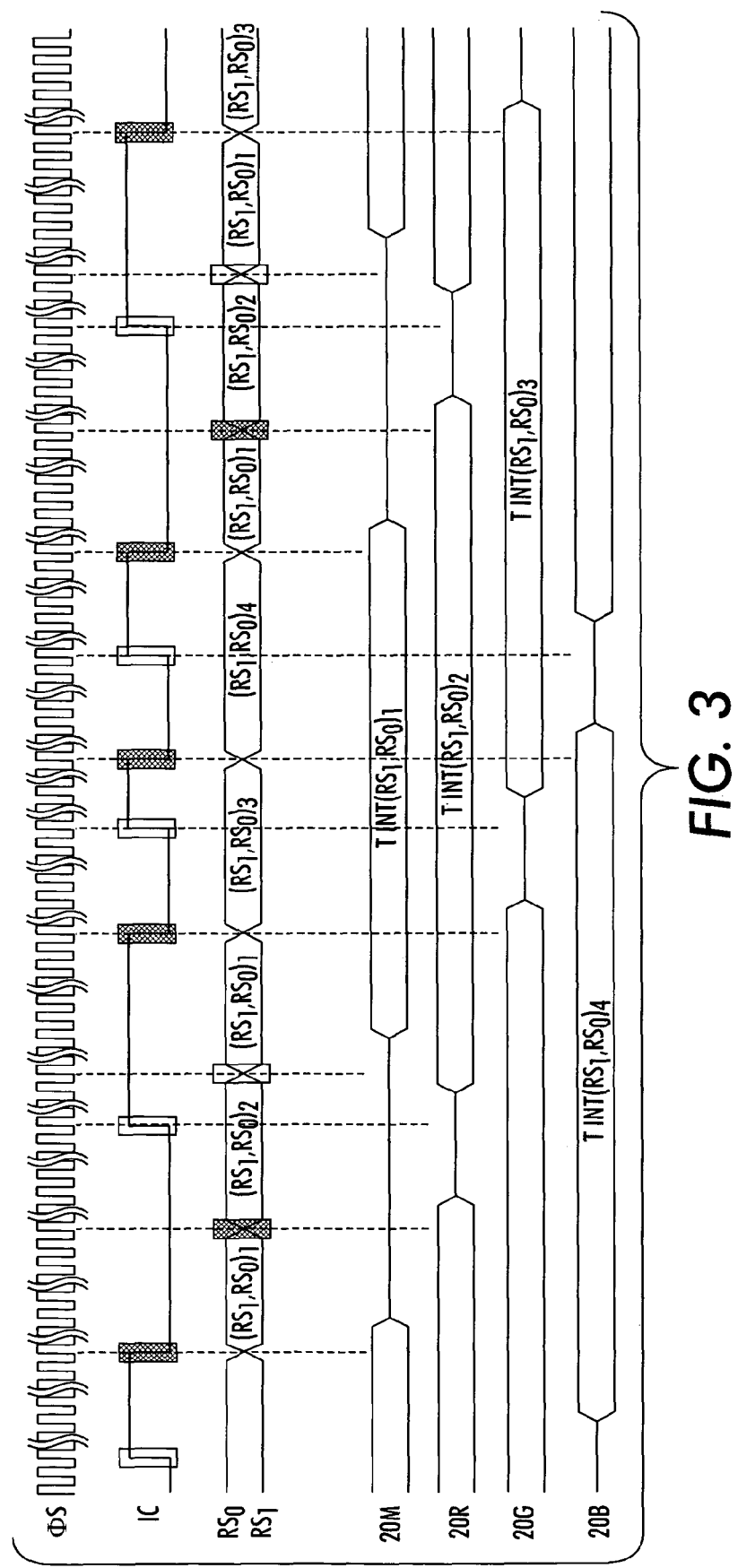
FIG. 3 is a simplified timing diagram showing a typical operation of a chip for one cycle of operation.

FIG. 3 is a diagram showing the operation of chip 10 in detail through an operational cycle of a four-row chip such as 10 shown in FIG. 2. The pixel clock $\phi_S$ runs constantly, which establishes the granularity of selected times for starting and stopping integration periods within each operational cycle of the chip 10. The IC line changes state at different predetermined times during the operational cycle; as shown in the Figure, in this particular embodiment, when the IC line changes state as indicated by the clear boxes, the integration time of a selected subset is started, and, when the IC line changes state as indicated by the hatched boxes, the integration time of a selected subset is ended (taking into account, as shown, some delay in the operation of the circuitry on the chip causing the change in integration state). As further can be seen in the Figure, at some time prior to each change in state, the states of the row select lines RS0, RS1 change. The combination of changes in state on the row select lines and the IC line result in, as shown in the bottom portion of the Figure, beginnings and endings of integration times T INT $(RS_1, RS_0)$ on selected subsets of photosensors 20M, 20R, 20G, 20B, as indicated.

As can be seen, using the basic selection system here described, the integration time of each subset of photosensors, or in this case row of photosensors for a particular primary color, can be precisely controlled for its start time within a cycle of operation, and also its duration; in other words, each set of photosensors can be controlled as to when it starts "looking at" a set of small areas in an image being scanned, and for how long. The different rows or subsets of photosensors become effectively independently controllable.

There are different ways in which the controller 26 can operate. In one method, the controller polls the row select lines RS1 and RS0 in response to receiving a signal on the IC line, to find out which subset of photosensors should be controlled. In another method, the controller 26, in response to a change in the state of the row select lines RS1 and RS0, makes a connection to the newly-identified subset and then polls the IC line for the precise moment in which the change in integration state is to occur.

The selection arrangement as here described can also be used for effectively shutting off certain subsets of photosensors, by never selecting them in the course of a cycle of operation, such as to operate the scanning system in a monochrome mode.

Although the present embodiment is directed toward controlling the integration times of different-filtered linear rows of photosensors, the operating principle can be applied to controlling any kind of subsets of photosensors in an apparatus, such as in a two-dimensional photosensor array as would be found in a digital camera. The different, effectively independently-controllable subsets could be related by color (such as to alter the color balance or other output of the apparatus); or by sub-area within a the linear or two-dimensional array (in case only a portion of the array is desired to be used at a particular time). Photosensors of different selectable subsets could be commingled with each other within the array, such as to enable "low resolution" operation; i.e., in low resolution only an evenly-distributed subset of photosensors in the array would be read out. The overall system can also facilitate an array wherein one subset of photosensors are effectively provided with a longer integration or exposure time than another commingled subset: such an arrangement may be useful in improving the exposure latitude of a digital camera, such as to allow taking a long-exposure picture and a short-exposure picture simultaneously.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of operating an imaging apparatus, the apparatus having a plurality of subsets of photosensors, comprising:
    sending to the apparatus an integration control signal, the integration control signal causing a change in integration state of a selected subset of photosensors;
    sending to the apparatus a selection signal, the selection signal having at least two bits, the selection signal identifying the selected subset of photosensors; and
    at least one of (a) in response to receiving the integration control signal, polling in real-time a status of a most recent selection signal, and (b) in response to receiving the selection signal, polling in real-time a status of a most recent integration control signal.

2. The method of claim 1, the integration signal capable of causing a beginning or an ending of an integration period for the selected subset of photosensors.

3. The method of claim 1, each subset of photosensors being sensitive to a predetermined range of wavelength.

4. The method of claim 1, each subset of photosensors being arranged in a linear array.

5. The method of claim 1, the selection signal having at least two parallel bits.

6. The method of claim 1, the imaging apparatus comprising at least one chip, the chip having one line for accepting the integration control signal.

7. The method of claim 1, the imaging apparatus comprising at least one chip, the chip having at least two lines for accepting the selection signal.

8. The method of claim 1, the imaging apparatus comprising a plurality of chips, each chip having one line for accepting the integration control signal.

9. The method of claim 1, the imaging apparatus comprising a plurality of chips, each chip having at least two lines for accepting the selection signal.

10. An imaging apparatus, comprising:
    a plurality of subsets of photosensors,
    at least one line for accepting an integration control signal, the integration control signal causing a change in integration state of a selected subset of photosensors;
    at least two lines for accepting a selection signal, the selection signal having at least two parallel bits, the selection signal identifying the selected subset of photosensors; and
    means for performing at least one of (a) in response to receiving the integration control signal, polling in real-time a status of a most recent selection signal, and (b) in response to receiving the selection signal, polling in real-time a status of a most recent integration control signal.

11. The apparatus of claim 10, the integration signal capable of causing a beginning or an ending of an integration period for the selected subset of photosensors.

12. The apparatus of claim 10, each subset of photosensors being sensitive to a predetermined range of wavelength.

13. The apparatus of claim 10, each subset of photosensors being arranged in a linear array.

14. The apparatus of claim 10, wherein at least one subset of photosensors and the line for accepting the integration control signal are disposed on one chip.

15. The apparatus of claim 10, the apparatus comprising a plurality of chips, each chip having at least one subset of photosensors.

16. The apparatus of claim 10, the apparatus comprising a plurality of chips, each chip having a line for accepting the integration control signal.

* * * * *